(12) United States Patent
Abe

(10) Patent No.: US 8,507,608 B2
(45) Date of Patent: Aug. 13, 2013

(54) PROPYLENE POLYMER RESIN COMPOSITION

(75) Inventor: Shigehiko Abe, Yokkaichi (JP)

(73) Assignee: Tosoh Corporation, Shunan-shi (JP)

( * ) Notice: Subject to any disclaimer, the term of this patent is extended or adjusted under 35 U.S.C. 154(b) by 0 days.

(21) Appl. No.: 13/264,532

(22) PCT Filed: Apr. 14, 2010

(86) PCT No.: PCT/JP2010/056648
§ 371 (c)(1),
(2), (4) Date: Oct. 14, 2011

(87) PCT Pub. No.: WO2010/119883
PCT Pub. Date: Oct. 21, 2010

(65) Prior Publication Data
US 2012/0035290 A1 Feb. 9, 2012

(30) Foreign Application Priority Data

Apr. 14, 2009 (JP) .................................. 2009-097925

(51) Int. Cl.
*C08F 8/00* (2006.01)
*C08L 23/04* (2006.01)

(52) U.S. Cl.
USPC ......................................... 525/191; 525/240

(58) Field of Classification Search
USPC ............................................... 525/191, 240
See application file for complete search history.

(56) References Cited

U.S. PATENT DOCUMENTS

| | | | |
|---|---|---|---|
| 5,047,485 A | 9/1991 | DeNicola, Jr. et al. | |
| 5,733,975 A | 3/1998 | Aoyama et al. | |
| 7,678,866 B2 | 3/2010 | Yamada et al. | |
| 7,838,611 B2 | 11/2010 | Yamada et al. | |
| 2002/0043643 A1 | 4/2002 | Korehisa et al. | |
| 2004/0224591 A1* | 11/2004 | Thai et al. ..................... | 442/181 |
| 2005/0031815 A1 | 2/2005 | Kageyama et al. | |
| 2005/0203232 A1* | 9/2005 | Rolland et al. ................ | 524/425 |
| 2009/0137755 A1 | 5/2009 | Yamada et al. | |

FOREIGN PATENT DOCUMENTS

| | | |
|---|---|---|
| CN | 1341670 A | 3/2002 |
| CN | 1608106 A | 4/2005 |
| CN | 10134176 A | 1/2009 |
| JP | 2-298536 | 12/1990 |
| JP | 5-339433 | 12/1993 |
| JP | 07 062131 | 3/1995 |
| JP | 11-181162 | 7/1999 |
| JP | 2004-346304 | 12/2004 |
| JP | 2007-169339 | 7/2007 |
| JP | 2007 169339 | 7/2007 |

OTHER PUBLICATIONS

International Search Report Issued Jul. 27, 2010 in PCT/JP10/056648 Filed Apr. 14, 2010.
Office Action issued Nov. 14, 2012, in Chinese counterpart Patent Application No. CN 201080026358.1.

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

A propylene polymer resin composition comprising 50-99 wt. % of a propylene polymer resin and 1-50 wt. % of an ethylene polymer resin, wherein said ethylene polymer resin has the following characteristics (A) through (E): (A) a density (d), as measured by a density gradient tube method according to JIS K6760, of 940-960 kg/m$^3$; (B) a melt flow rate (MFR), as measured at 190° C. under a load of 2.16 kg, of 1-10 g/10 min.; (C) a frequency of terminal vinyl of not more than 0.2 per 1,000 carbon atoms; (D) a melt strength ($MS_{160}$), as measured at 160° C., of at least 100 mN; and (E) an activation energy of flow (Ea) of not larger than 35 kJ/mol. The propylene polymer resin has high melt strength and exhibits enhanced fluidity, processability and shapability.

16 Claims, No Drawings

PROPYLENE POLYMER RESIN COMPOSITION

This application is a 371 of PCT/JP10/56648 filed Apr. 14, 2010. Priority to Japanese patent application 2009-097925 filed Apr. 14, 2009, is claimed.

TECHNICAL FIELD

This invention relates to a propylene polymer resin composition comprising a propylene polymer resin and an ethylene polymer resin. More particularly, it relates to a propylene resin composition to which a specific ethylene polymer resin has been incorporated to improve the blow molding property and foam processing property of the resin composition.

Propylene polymer resins are inexpensive and have good physical properties, and therefore, they are widely used as various shaped articles made by injection molding, extrusion processing and other generally adopted processing methods. However, propylene polymer resins have a low melt viscosity and a low melt strength, and hence have a problem in melt processing such as injection molding and extrusion processing. Especially propylene polymer resins have problems such that foam cells formed by processing easily collapse, and further that drawdown, i.e., a phenomenon such the shape formed by blow molding or melt spinning is not kept and drown down, occurs at the melt processing step.

To solve the above-mentioned problems, i.e., improve the melt strength of a propylene polymer resin, several proposals have been made. A typical example of the proposals is a method of incorporating a low-density polyethylene (LDPE) produced using a high pressure radical polymerization process in the propylene polymer resin. However, when the amount of LDPE added is small, a desired effect of melt strength enhancement is difficult to achieve. In contrast, when the amount of LDPE added is large, the rigidity characterizing the propylene polymer resin is reduced. Thus, the above-mentioned problems have not been solved to a satisfying extent.

The proposals of improving the melt strength of a propylene polymer resin include the following method and resin compositions.

A method for irradiating a straight chain propylene polymer with high-energy ionizing radiation such as electron beams and gamma rays in the presence of reactive oxygen to produce long chain branches on the polymer, thereby enhancing the melt processability of the propylene polymer (see, for example, JP H2-298536 A [Claim]).

A resin composition comprising a propylene polymer and a core-shell graft copolymer prepared by graft-copolymerizing a rubbery polymer with a vinyl monomer (see, for example, JP H5-339433 A [Claim]).

A resin composition comprising a propylene polymer, an ethylene-α-olefin copolymer rubber and a polyamide fiber to enhance the melt strength of the propylene polymer (see, for example, JP H11-18162 A [Claim]).

Further, the following resin composition has been proposed.

An ethylene polymer resin having improved heat stability and exhibiting enhanced processability and moldability in a broad temperature range, which is produced by polymerizing ethylene in the presence of a macromonomer composed of an ethylene homopolymer or copolymer having a vinyl terminal group, and using a polymerization catalyst comprised of a clay material having treated with a specific metallocene compound and an organic compound (see, for example, JP 2004-346304 A [Claim and paragraph [0064]] and JP 2007-169339 A [Claim and paragraph [0040]]).

SUMMARY OF THE INVENTION

Problems to be Solved by the Invention

The above-proposed method and resin compositions have problems.

In the method described in JP H2-298536 A, complicated procedures are essential for a step of irradiating the propylene polymer with high-energy ionizing radiation in the presence of reactive oxygen, and a step of, after irradiation with high-energy ionizing radiation, deactivating free radicals produced by said irradiation. Further an equipment for the irradiating with high-energy ionizing radiation is expensive.

In the resin composition described in JP H5-339433 A, a large amount of the core-shell graft copolymer must be incorporated in a propylene polymer to obtain a resin composition having a sufficiently enhanced melt strength.

In the resin composition described in JP H11-18162 A,
A resin composition comprising a propylene polymer, an ethylene-α-olefin copolymer rubber has a poor compatibility with a polyamide fiber, therefore, the polyamide fiber is not uniformly dispersed in the ethylene-α-olefin copolymer rubber, and interphase adhesion between the copolymer rubber and the polyamide fiber, with the results of poor appearance and poor tensile strength of shaped articles.

JP 2004-346304 A [Claim and paragraph [0064]] and JP 2007-169339 A teach nothing about the use of the ethylene polymer resin described therein as an additive such as a modifier or a function-improving aid for a propylene polymer resin or other polymer resins.

Thus, an industrially beneficial technique for improving a foaming property and processability, more particularly a blow foaming property and foam processing property of a propylene polymer resin composition has not heretofore proposed.

To solve the above-mentioned problems, the present inventors made an extensive research and found that a propylene polymer resin composition having incorporated therein a specific ethylene polymer has an enhanced melt strength and exhibits improved melt shapability, especially improved blow foaming property and foam processing property. Based on this finding, the present invention has been completed.

Thus, in one aspect of the present invention, there is provided a propylene polymer resin composition comprising 50% to 99% by weight of a propylene polymer resin and 1% to 50% by weight of an ethylene polymer resin, wherein said ethylene polymer resin has the following characteristics (A) through (E):

(A) a density (d), as measured by a density gradient tube method according to JIS K6760, in the range of 940 kg/m³ to 960 kg/m³;

(B) a melt flow rate (MFR), as measured at 190° C. under a load of 2.16 kg, in the range of 1 g/10 min. to 10 g/10 min.;

(C) a frequency of terminal vinyl of not more than 0.2 per 1,000 carbon atoms;

(D) a melt strength ($MS_{160}$), as measured at 160° C., of at least 100 mN; and (E) an activation energy of flow (Ea) of not larger than 35 kJ/mol.

In other aspects of the present invention, there are provided a foam shaped article made by foaming the above-mentioned propylene polymer resin composition, and further provided a blow molded article made by blow molding the above-mentioned propylene polymer resin composition.

In still another aspect of the present invention, there is provided an extrusion foamed article made by extrusion foaming the above-mentioned propylene polymer resin composition which has a melt flow rate (MFR) as measured at 230° C. of smaller than 10 g/10 min. and a melt strength ($MS_{190}$) as measured at 190° C. of at least 10 mN.

Effect of the Invention

The propylene polymer resin composition of the present invention, which has incorporated therein a specific ethylene polymer resin, exhibits enhanced flowability and processability as compared with conventional propylene polymer resins. Therefore, when a small amount of the ethylene polymer resin is incorporated in the propylene polymer resin, the melt strength of the propylene polymer resin can be greatly enhanced. Thus, the shapability and processability of a propylene polymer resin can be improved while the beneficial properties of the propylene polymer resin are substantially kept.

EMBODIMENTS FOR CARRYING OUT THE INVENTION

The propylene polymer resin composition of the present invention and shaped articles thereof will be described in detail.

Ethylene Polymer Resin

The ethylene polymer resin used in the present invention which has the characteristics (A) through (E) falls within the category generally called as a polyethylene resin. As preferable examples of the ethylene polymer resin, there can be mentioned an ethylene homopolymer comprised of repeating units derived from ethylene, and an ethylene-α-olefin copolymer comprised of repeating units derived from ethylene and repeating units derived from an α-olefin having 3 to 8 carbon atoms. These ethylene homopolymer and copolymer give, when they are blended with a propylene resin, a propylene resin composition having high heat resistance and high rigidity. The repeating units derived from an α-olefin having 3 to 8 carbon atoms are repeating units formed from the α-olefin having 3 to 8 carbon atoms and are contained in the ethylene-α-olefin copolymer. The ethylene polymer resin having the characteristics (A) through (E) used in the present invention does not include an elastomer or rubber.

The α-olefin having 3 to 8 carbon atoms includes, for example, propylene, 1-butene, 1-hexene, 1-octene, 4-methyl-1-pentene, and 3-methyl-1-butene. These α-olefins having 3 to 8 carbon atoms may be used either alone or as a combination of at least two thereof. The proportion by mole of ethylene units to units of the α-olefin having 3 to 8 carbon atoms in the ethylene-α-olefin copolymer is preferably in the range of 1/1 to 200/1, more preferably 3/1 to 100/1 and especially preferably 5/1 to 50/1.

The ethylene polymer resin used in the present invention has a density (d), as measured by a density gradient tube method according to JIS K6760, in the range of 940 kg/m$^3$ to 960 kg/m$^3$, preferably 945 kg/m$^3$ to 955 kg/m$^3$. When the density (d) is smaller than 940 kg/m$^3$, the melting temperature of the ethylene polymer resin is low and the resulting propylene polymer resin composition has poor heat resistance. In contrast, when the density (d) is larger than 960 kg/m$^3$, the melting temperature of the ethylene polymer resin is high, and the resulting propylene polymer resin composition has high rigidity but poor impact resistance.

The ethylene polymer resin used in the present invention has a melt flow rate, as measured at 190° C. under a load of 2.16 kg, (which melt flow rate is hereinafter referred to as "MFR" when appropriate) in the range of 1 g/10 min. to 10 g/10 min. If the MFR is smaller than 1 g/10 min., when the ethylene polymer resin is blended with a propylene polymer resin to produce the propylene polymer resin composition, the load imposed to an extruder undesirably increases and the productivity is reduced. In contrast, if the MFR is larger than 10 g/10 min., the resulting propylene polymer resin composition exhibits a small melt strength and poor processability, and gives a shaped article having poor mechanical strength.

The ethylene polymer resin used in the present invention has a frequency of terminal vinyl of not more than 0.2, preferably not more than 0.1, per 1,000 carbon atoms. If the frequency of terminal vinyl exceeds 0.2 per 1,000 carbon atoms, the resulting propylene polymer resin composition exhibits poor heat stability and tends to exhibit thermal deterioration, and gives a shaped article easily exhibiting yellow discoloration.

The frequency of terminal vinyl is determined as follows. That is, the ethylene polymer resin is heat-pressed into a film, and the film is cooled in an ice bath. Absorption is measured in a wavelength range of 4,000 cm$^{-1}$ to 400 cm$^{-1}$ by a Fourier transform infrared spectrophotometer (FT-IR). The frequency of vinyl terminal is calculated by the following formula.

Frequency of terminal vinyl per 1,000 carbon atoms=$a \times A/L/d$ wherein a: absorption coefficient
A: absorbance attributed to terminal vinyl at a wavelength of 909 cm$^{-1}$
L: film thickness (mm)
d: film density (kg/m$^3$)

"a" is determined from a calibration curve drawn using a film specimen of which the frequency of terminal vinyl per 1,000 carbon atoms has been confirmed by $^1$H-NMR measurement. The $^1$H-NMR measurement is conducted in a mixed solvent composed of deuterated benzene and o-dichlorobenzene at 130° C. by a NMR spectroscopy (tradename "GS×400" available from JEOL Ltd.).

The frequency of terminal vinyl per 1,000 carbon atoms is calculated from an integrated value of the ratio of peaks attributed to terminal vinyl groups to peaks attributed to methylene groups. Each peak is determined by regarding a peak with chemical shift of 1.3 ppm as attributed to methylene, and a peak with chemical shift of 4.8 to 5.0 ppm as attributed to terminal vinyl, as tetramethylene being a chemical shift standard of 0 ppm.

The ethylene polymer resin used in the present invention has a melt strength ($MS_{160}$), as measured at 160° C., of at least 100 mN. If the melt strength is smaller than 100 mN, when the resulting propylene polymer resin composition is subjected to extrusion foaming, undesirable defoaming occurs to a great extent, and consequently, the expansion ratio is reduced and the control of the shape of a foamed article becomes difficult, and a special control of temperature is required for extrusion foaming. Thus the shapability is reduced and a shaped article foamed to a desired extent is difficult or impossible to obtain.

The ethylene polymer resin used in the present invention preferably satisfies a relationship between melt strength ($MS_{160}$) and melt flow rate (MFR), expressed by the following formula (1), more preferably by the following formula (2):

$MS_{160}>90-130\times\log(MFR)$ (1)

$MS_{160}>110-130\times\log(MFR)$ (2)

wherein $MS_{160}$ is a melt strength (mN) as measured at 160° C., and MFR is a melt flow rate (g/10 min.).

If the ethylene polymer resin satisfies the above-mentioned relationship between melt strength ($MS_{160}$) and melt flow rate (MFR), expressed by the above formula (1), when the resulting propylene polymer resin composition is subjected to extrusion foaming, undesirable defoaming occurs only to a minimized extent, and consequently, the expansion ratio is not reduced and the control of the shape of a foamed article is easy, and a special control of temperature is not required for extrusion foaming. Thus the processability is good and a shaped article foamed to a desired extent can be produced without difficulty.

The ethylene polymer resin used in the present invention preferably further satisfies a relationship between melt strength ($MS_{160}$) and a melt strength ($MS_{190}$), expressed by the following formula (3), more preferably by the following formula (4):

$$MS_{160}/MS_{190} < 1.8 \quad (3)$$

$$MS_{160}/MS_{190} < 1.7 \quad (4)$$

wherein $MS_{160}$ is a melt strength (mN) as measured at 160° C., and $MS_{190}$ is a melt strength (mN) as measured at 190° C.

If the ethylene polymer resin satisfies the above-mentioned relationship between melt strength ($MS_{160}$) and melt strength ($MS_{190}$), expressed by the formula (3), the melt strengths of the ethylene polymer composition vary only slightly depending upon the temperature, and, when a resulting propylene polymer resin composition having incorporated with the ethylene polymer resin is subjected to foam processing, the foam processing temperature can be controlled without difficulty and the foam processing can be carried out in a wide temperature range. Therefore, a foam shaped article having uniform cells and a high expansion ratio can be obtained.

The melt strength ($MS_{190}$) is measured using a die having a length of 8 mm and a diameter of 2.095 mm, and at an entrance angle of 90 degrees, a shear rate of $10.8 \, s^{-1}$, a draw ratio of 47 and a measurement temperature of 190° C. When the maximum draw ratio is smaller than 47, the measurement of $MS_{190}$ is conducted at the maximum draw ratio as defined as the draw ratio at breaking. The melt strength ($MS_{160}$) is measured by the same method as mentioned above except that the measurement temperature is changed to 160° C.

The ethylene polymer resin used in the present invention has an activation energy of flow (Ea) of not larger than 35 kJ/mol.

If the ethylene polymer resin has an Ea of larger than 35 kJ/mol, the temperature dependence of melt viscosity is undesirably large, and a resulting propylene polymer resin composition having incorporated with the ethylene polymer resin is difficult to foam without strict adjustment of the processing temperature, and, the admissible foam processing temperature is narrow.

The ethylene polymer resin used in the present invention preferably further satisfies a relationship between an activation energy of flow (Ea; kJ/mol) and a density (d; kg/m³), expressed by the following formula (5), more preferably by the following formula (6):

$$125 - 0.105d < Ea < 88 - 0.0550d \quad (5)$$

$$127 - 0.107d < Ea < 88 - 0.060d \quad (6)$$

When the ethylene polymer resin has an Ea of larger than (125−0.105d), when a resulting propylene polymer resin composition having incorporated with the ethylene polymer resin is foamed, the resin composition exhibit improved processability and moldability. Thus, the propylene polymer resin composition can be foamed without strict adjustment of the processing temperature, and, the admissible foaming temperature is broad.

The activation energy of flow (Ea) is determined by conducting a dynamic viscoelasticity measurement within the range of 160° C. to 230° C., and substituting the obtained shift factor into the Arrhenius equation The ethylene polymer resin used in the present invention preferably has a ratio (Mw/Mn) of weight average molecular weight (Mw) to number average molecular weight (Mn) in the range of 5 to 10, more preferably 5 to 8, in view of the good effect of, when the ethylene polymer resin is incorporated in a propylene polymer resin, enhancing the melt strength of the propylene polymer resin.

The Mw/Mn ratio is calculated from the weight average molecular weight (Mw) and the number average molecular weight (Mn), which are measured by gel permeation chromatography (GPC) and the calibration curve of molecular weight is standardized according to polyethylene.

The ethylene polymer resin used in the present invention is not particularly limited provided that it falls within the category of ethylene polymers, and any type of production process can be adopted for the production thereof. For example, the ethylene polymer resin can be produced by the processes and conditions, which are described specifically in the examples, as described below. Modifications can be added arbitrarily to the described processes and conditions.

The ethylene polymer resin used in the present invention can be produced by a process for polymerizing ethylene or copolymerizing ethylene with an α-olefin having 3 to 8 carbon atoms in the presence of a metallocene catalyst. The metallocene catalyst is preferably prepared from a crosslinked biscyclopentadienylzirconium complex wherein two cyclopentadienyl groups are crosslinked with a crosslinking group comprising a chain of at least two kinds of atoms or a chain of at least two atoms (which zirconium complex is hereinafter referred to as "ingredient (a)"); and, a crosslinked cyclopentadienyl(fluorenyl)zirconium complex and/or a crosslinked indenyl(fluorenyl)zirconium complex (which zirconium complexes are hereinafter referred to as "ingredient (b)").

As mentioned above, the ethylene polymer resin can be produced by the processes and conditions, specifically described in the examples, as described below, and modifications can be added to the described processes and conditions. Such modifications include, for example, conditions relating to the catalyst ingredients such as structures of ingredient (a) and ingredient (b), a relative amount of ingredient (b) to ingredient (a), and the kind of a co-catalyst ingredient used; and polymerization conditions such as a polymerization temperature, a partial pressure of ethylene, an amount of a molecular weight modifier such as coexisting hydrogen, and an amount of comonomer to be added. By adopting these modifications, the density and MFR of the polymer can be varied. Further, by combining the polymerization conditions with a multi-polymerization step, the distribution of molecular weight can be broadened.

As other examples of the modifications, the activation energy of flow (Ea) can be controlled by choosing the kind of ingredient (a) or increasing the amount of an α-olefin comonomer having 3 to 8 carbon atoms. The frequency of long chain branches in the ethylene polymer resin can be increased by increasing the frequency of terminal vinyl in the ethylene polymers prepared by polymerization using the ingredient (a), or by choosing the kind of ingredient (b) or increasing the relative amount of ingredient (b) to ingredient (a). The molecular weight distribution Mw/Mn of the ethylene polymer resin can be controlled by selectively using a specific ingredient (a) to produce an ethylene polymer with a low molecular weight, or a specific ingredient (b) to produce an ethylene polymer with a high molecular weight.

As specific examples of the ingredient (a), there can be mentioned dichlorides such as 1,1,3,3-tetramethyldisiloxane-1,3-diyl-bis(cyclopentadienyl)zirconium dichloride, 1,1-dimethyl-1-silaethane-1,2-diyl-bis(cyclopentadienyl)-zirconium dichloride, propane-1,3-diyl-bis(cyclopentadienyl)-zirconium dichloride, butane-1,4-diyl-bis(cyclopentadienyl)-zirconium dichloride, cis-2-butene-1,4-diyl-bis(cyclopentadienyl)zirconium dichloride and 1,1,2,2-tetramethyldisilane-1,2-diyl-bis(cyclopentadienyl)-zirconium dichloride; and dimethyl, diethyl, dihydroxy, diphenyl and dibenzyl compounds corresponding to the above-mentioned transition-metal compounds.

As specific examples of the ingredient (b), there can be mentioned dichlorides such as diphenylmethylene-(1-cyclopentadienyl)(9-fluorenyl)zirconium dichloride, diphenylmethylene(2-trimethylsilyl-1-cyclopentadienyl)-(9-fluorenyl)zirconium dichloride, diphenylmethylene-(1-cyclopentadienyl)(2,7-dimethyl-9-fluorenyl) zirconium dichloride, diphenylmethylene(1-cyclopentadienyl)-(2,7-di-t-butyl-9-fluorenyl)zirconium dichloride, isopropylidene(1-cyclopentadienyl)(9-fluorenyl)zirconium dichloride, isopropylidene(1-cyclopentadienyl)-(2,7-di-t-butyl-9-fluorenyl) zirconium dichloride, diphenylsilanediyl(1-cyclopentadienyl)(9-fluorenyl)zirconium dichloride, dimethylsilanediyl(1-cyclopentadienyl)-(9-fluorenyl)zirconium dichloride, diphenylmethylene-(1-indenyl)(9-fluorenyl)zirconium dichloride, diphenylmethylene(2-phenyl-1-indenyl)(9-fluorenyl)zirconium dichloride and diphenylmethylene(2-phenyl-1-indenyl)-(2,7-di-t-butyl-9-fluorenyl) zirconium dichloride; and dimethyl, diethyl, dihydroxy, diphenyl and dibenzyl compounds corresponding to the above-mentioned transition-metal compounds.

As specific examples of the ingredient (a) and the ingredient (b), there can be further mentioned transition metal compounds which have a titanium atom or a hafnium atom instead of a zirconium atom in the above-recited transition metal compounds.

The proportion in amount of the ingredient (b) to the ingredient (a) is not particularly limited, but the amount of ingredient (b) is preferably in the range of 0.0001 to 100 times by mole, more preferably 0.001 to 10 times by mole, of the amount of ingredient (a).

The metallocene catalyst prepared using the ingredient (a) and the ingredient (b) includes, for example, a catalyst comprised of ingredient (a), ingredient (b) and an organoaluminum compound (hereinafter referred to as "ingredient (c)"); a catalyst comprised of ingredient (a), ingredient (b) and an aluminoxane (hereinafter referred to as "ingredient (d)"); a catalyst comprised of ingredient (a), ingredient (b), ingredient (c) and ingredient (d); a catalyst comprised of ingredient (a), ingredient (b), and at least one salt selected from the group consisting of a protonic acid salt (hereinafter referred to as "ingredient (e)"), a Lewis acid salt (hereinafter referred to as "ingredient (f)") and a metal salt (hereinafter referred to as "ingredient (g)"); a catalyst comprised of ingredient (a), ingredient (b) and at least one salt selected from the group consisting of ingredient (e), ingredient (f) and ingredient (g), and further ingredient (c); a catalyst comprised of ingredient (a), ingredient (b), ingredient (d) and an inorganic oxide (hereinafter referred to as "ingredient (h)"); a catalyst comprised of ingredient (a), ingredient (b) and ingredient (h), and at least one salt selected from the group consisting of ingredient (e), ingredient (f) and ingredient (g); a catalyst comprised of ingredient (a), ingredient (b), ingredient (c) and ingredient (h), and at least one salt selected from the group consisting of ingredient (e), ingredient (f) and ingredient (g); a catalyst comprised of ingredient (a), ingredient (b), a clay mineral (hereinafter referred to as "ingredient (i)") and ingredient (c); and a catalyst comprised of ingredient (a), ingredient (b) and clay mineral which has been modified with an organic compound (hereinafter referred to as "ingredient (j)").

Of these, a catalyst comprised of ingredient (a), ingredient (b) and ingredient (j) is preferable.

As the clay mineral which can be used as the ingredient (i) and the ingredient (j), finely divided particles predominantly comprised of microcrystalline silicate salts are mentioned. Most clay minerals have a layer structure composed of a plurality of layers having negative charges of various valences among the layers. This layer structure is greatly different from a three-dimensional structure of a metal oxide such as silica and alumina. On the basis of valence of negative charges, the clay minerals with the layer structure are classified into a group having a negative charge valence of approximately zero as its chemical formula such as pyrophylite, kaolinite, dickite and a talc group; a smectite group having a negative charge valence as its chemical formula in the range of approximately 0.25 to approximately 0.6; a vermiculite group having a negative charge valence as its chemical formula of approximately 0.6 to 0.9; a mica group having a negative charge valence as its chemical formula of approximately 1; and a brittle mica group having a negative charge valence as its chemical formula of approximately 2. Each group of the clay mineral includes various clay minerals. For example, a clay mineral of smectite group includes, for example, montmorillonite, beidellite, saponite and hectorite. The clay minerals may be used as a combination of at least two kinds thereof.

The clay mineral which has been modified with an organic compound in the ingredient (j) refers to that the clay mineral has been modified so that an organic ion has been introduced to form anion composite among layers in the layer structure of the clay mineral. As examples of the organic compound, there can be mentioned N,N-dimethyl-n-octadecylamine hydrochloride, N,N-dimethyl-n-eicosylamine hydrochloride, N,N-dimethyl-n-docosylamine hydrochloride, N,N-dimethyl-oleylamine hydrochloride, N,N-dimethyl-behenylamine hydrochloride, N-methyl-bis(n-octadecyl)amine hydrochloride, N-methyl-bis(n-eicosyl)amine hydrochloride, N-methyl-dioleylamine hydrochloride, N-methyl-dibehenylamine hydrochloride and N,N-dimethylaniline hydrochloride.

The catalyst comprised of ingredient (a), ingredient (b) and ingredient (j) can be prepared by contacting ingredient (a), ingredient (b) and ingredient (j) with each other in an organic solvent. As specific examples of the preparation method, there can be mentioned a method of contacting ingredient (a) with ingredient (j) and then adding ingredient (b) to the contact product; a method of contacting ingredient (b) with ingredient (j) and then adding ingredient (a) to the contact product; a method of contacting ingredient (a) with ingredient (b) and then adding ingredient (j) to the contact product; a method of contacting ingredient (a) with ingredient (b) and then adding the contact product to ingredient (j).

The organic solvent used in the contact reaction includes, for example, aliphatic hydrocarbons such as butane, pentane, hexane, heptane, octane, nonane, decane, cyclopentane and cyclohexane; aromatic hydrocarbons such as benzene, toluene and xylene; ethers such as ethyl ether and n-butyl ether; halogenated hydrocarbons such as methylene chloride and chloroform; 1,4-dioxane, acetonitrile and tetetrahydrofuran.

The contact reaction is carried out preferably at a temperature in the range of 0° C. to 200° C.

The amounts of ingredients (a), (b) and (c) are such that the amount of ingredient (a) is in the range of 0.0001 to 100 mmol, preferably 0.001 to 10 mmol, per 1 g of ingredient (j), and the amount of ingredient (b) is in the range of 0.1 to 10,000 mol, preferably 1 to 1,000 mol, per 1 mol of ingredient (a).

The thus-prepared contact reaction product of ingredient (a), ingredient (b) and ingredient (j) may be used either as it is without washing, or after washing. When ingredient (a) or ingredient (b) is a dihalide, it is preferable to further add ingredient (c). Further ingredient (c) can be added for the purpose of removing impurities in ingredient (j), a polymerization solvent and the olefin monomer.

The polymerization reaction for the production of the ethylene polymer resin is preferably carried out at a polymerization temperature in the range of −100° C. to 120° C. In view of the productivity, the polymerization temperature is more preferably 20° C. to 120° C., and especially preferably 60° C. to 120° C.

The polymerization time is preferably in the range of 10 seconds to 20 hours. The polymerization pressure is preferably in the range of normal pressure to 300 MPa.

When ethylene is copolymerized with an α-olefin having 3 to 8 carbon atoms, the feed ratio of these monomers are chosen so that the mol ratio of ethylene to an α-olefin having 3 to 8 carbon atoms is in the range of 1/1 to 100/1, preferably 3/1 to 100/1 and more preferably 5/1 to 50/1.

The molecular weight of the polymer can be controlled by using hydrogen or other molecular weight modifier at polymerization. The polymerization can be carried out by any of batchwise, semi-continuous and continuous procedures. The polymerization can be carried out by a multi-stage polymerization procedure including at least two stages conducted under different conditions.

The polymerization can be carried out in any state of slurry, solution and gas states. Especially when the polymerization is carried out in a slurry state, a powdery ethylene copolymer comprised of uniform finely divided particles can be produced stably and with good efficiency.

A medium used in the polymerization is not particularly limited and conventional organic solvents can be used. As specific examples of the organic solvents, there can be mentioned benzene, toluene, xylene, propane, isobutane, pentane, hexane, heptane, cyclohexane and gasoline. The α-olefin comonomers such as propylene, 1-butene, 1-hexene and 1-octene can also be used as the organic solvent.

After completion of the polymerization, the ethylene homopolymer or copolymer can be separated from the polymerization liquid medium and dried by the conventional procedure for recovery.

Propylene Polymer Resin Composition

The propylene polymer resin in which the above-mentioned ethylene polymer resin is incorporated is not particularly limited, and the polymer resin falling within a category of general propylene polymer resin can be used. The propylene polymer resin preferably includes a homopolymer of propylene, and block and random copolymers comprised of at least 80% by weight of propylene and not more than 20% by weight of other α-olefin monomers such as ethylene, butane-1,4-methylpentene-1 and octane-1. These propylene polymer resins may be used either alone or as a combination of at least two thereof. The propylene polymer resin does not include rubber or elastomer.

The propylene polymer resin preferably has a melt flow rate (MFR), as measured at 230° C. under a load of 2.16 kg according to JIS K7210, in the range of 0.05 g/10 min. to 1,000 g/10 min., more preferably 0.1 g/10 min. to 700 g/10 min., and especially preferably 0.5 g/10 min. to 500 g/10 min.

The relative amounts of the ethylene polymer resin and the propylene polymer resin are such that, based on the sum of the ethylene polymer resin and the propylene polymer resin, the amount of the ethylene polymer resin is in the range of 1% to 50% by weight, preferably 5% to 20% by weight, and the amount of the propylene polymer resin is in the range of 50% to 99% by weight, preferably 80% to 95% by weight.

If the amount of the ethylene polymer resin is too small, the melt strength cannot be enhanced to a desired extent by the incorporation of the ethylene polymer resin, and a resulting propylene polymer resin composition has poor fluidity and exhibits poor processability and moldability. In contrast, if the amount of the ethylene polymer resin is too large, a resulting propylene polymer resin composition has reduced rigidity as compared with the propylene polymer resin.

The incorporation of the ethylene polymer resin in the propylene polymer resin for the preparation of the propylene polymer resin composition of the present invention can be conducted by the conventional resin blending methods. For example, conventional melt blending methods such as an extrusion kneading method and a roll kneading method can be adopted.

In view of excellent foaming property and blow molding property, the propylene polymer resin composition according to the present invention preferably satisfies a relationship between a melt strength ($MS_{190}$, mN) and a melt flow rate (MFR, g/10 min.), expressed by the following formula (7):

$$MS_{190} > 40 - 20 \times \log(MFR) \tag{7}$$

where $MS_{190}$ and MFR are measured by the methods hereinbefore described.

According to the need, various additives can be incorporated in the propylene polymer resin composition of the present invention provided that the gist of the present invention can be kept. The additives include, for example, a stabilizer, a lubricant, a fire retardant, a dispersant, a filler, a foaming agent, a crosslinking agent, a ultraviolet stabilizer, an antioxidant and a colorant.

The processing of the propylene polymer resin composition of the present invention can be conducted by the conventional processing procedures such as, for example, an injection foaming procedure, and extrusion foaming procedure (including blow molding and sheet processing procedures). A blow molding procedure is especially preferred. As shaped articles made from the propylene polymer resin composition, there can be mentioned hollow articles made by blow molding, foamed articles (especially foamed sheet articles) made by extrusion foaming, and injection molded articles.

In the case of extrusion foaming of the conventional propylene polymer resin, when the polymer resin is extruded from a foam die at foaming, cells easily collapse and undesirable defoaming tends to occurs. At blow molding, the extruded molten polymer resin tends to droop down (drawdown) due to its own weight, and deformation of the deformed blow molded article easily occur, and the resulting blow molded article has problems in wall thickness and shape. Especially at extrusion foaming, great problems arise in collapse of bubbles and defoaming, reduction in the expansion ratio, and reduction in the ratio of closed-cell foams.

In contrast, the propylene polymer resin composition having high melt strength according to the present invention exhibits improved foaming property, blow molding property, and extrusion foaming property.

In the case when the propylene polymer resin composition is used for extrusion foaming, the resin composition preferably has a MFR, as measured at 230° C., of smaller than 10 g/10 min. When MFR of the resin composition is smaller than 10 g/10 min., drooping down of the resin composition is minimized at extrusion foaming, and sheet processing and blow molding can be easily conducted. Further, the propylene polymer resin composition preferably has a melt strength ($MS_{190}$), as measured at 190° C., of at least 10 mN.

EXAMPLES

The invention will now be specifically described by the following examples and comparative examples that by no means limit the scope of the invention.

Characteristics of ethylene polymers, propylene polymer resin compositions and shaped articles are determined by the following methods.

《Weight Average Molecular Weight (Mw), Number Average Molecular Weight (Mn) and Molecular Weight Distribution (Mw/Mn)》

Weight average molecular weight (Mw), number average molecular weight (Mn) and a ratio of Mw/Mn were measured by gel permeation chromatography (GPC). GPC apparatus ("HLC 8121GPC/HT" available from Tosoh Corporation) and a column ("TSKgel GMHhr-H (20) HT" available from Tosoh Corporation) were used. The column temperature was 140° C. 1,2,4-Trichlorobenzene was used as an eluting buffer. A specimen having a concentration of 1.0 mg/ml was prepared and 0.3 mL thereof was injected into the column. The calibration curve of molecular weight was standardized according to polystyrene having a known molecular weight. Mw and Mn were expressed in terms of those of a linear polyethylene standard.

《Density (d)》

The density (d) ($kg/m^3$) of an ethylene polymer was measured by a density gradient tube according to JIS K6760 (1995).

《Frequency of Terminal Vinyl》

The frequency of terminal vinyl of an ethylene polymer was determined on a film specimen which was prepared by heat-pressing the ethylene polymer into a film and cooling the film in an ice bath. Absorption was measured in a wavelength range of 4,000 $cm^{-1}$ to 400 $cm^{-1}$ by a Fourier transform infrared spectrophotometer (FT-IR) ("SPECTRUM ONE" Fourier transform infrared spectrophotometer, available from Perkin Elmer Inc.). The frequency of terminal vinyl was calculated by the following formula.

Frequency of terminal vinyl per 1,000 carbon atoms=$a \times A/L/d$ wherein a: absorption coefficient
A: absorbance attributed to terminal vinyl at a wavelength of 909 $cm^{-1}$
L: film thickness (mm)
d: film density ($kg/m^3$)

"a" was determined from a calibration curve drawn using a film specimen of which the frequency of terminal vinyl per 1,000 carbon atoms has been confirmed by $^1$H-NMR measurement. The $^1$H-NMR measurement was conducted in a mixed solvent composed of deuterated benzene and o-dichlorobenzene at 130° C. by a NMR spectroscopy ("GS×400" available from JEOL Ltd.).

The frequency of terminal vinyl per 1,000 carbon atoms was calculated from an integrated value of the ratio of peaks attributed to terminal vinyl groups to peaks attributed to methylene groups. Each peak was determined by regarding a peak with chemical shift of 1.3 ppm as attributed to methylene, and a peak with chemical shift of 4.8 to 5.0 ppm as attributed to terminal vinyl, as tetramethylsilane being a chemical shift standard of 0 ppm.

《Melt Flow Rate (MFR)》

MFR (g/10 min.) was measured at 190° C. under a load of 2.16 kg. A test specimen of an ethylene polymer was prepared by adding to the ethylene polymer 1,500 ppm of a heat stabilizer "Irganox 1010™" available from Ciba Speciality Chemicals Co. and 1,500 ppm of "Irgafos 168™" available from Ciba Speciality Chemicals Co., and kneading together the thus-obtained mixture by using an internal mixer "Laboplastomill™" available from Toyo Seiki Seisakusho K.K. at a screw rotation rate of 30 r.p.m. and a temperature of 190° C. under a stream of nitrogen gas for 30 minutes.

《Activation Energy of Flow (EA)》 (kJ/mol)

A test specimen of an ethylene polymer was prepared by the same procedure as above-mentioned for the measurement of MFR wherein heat stabilizers were previously added and kneaded together.

Using a disk-and-disk rheometer "MCR-300" available from Anton Paar GmbH, the shear storage modulus G' and the shear loss modulus G" were measured at an angular velocity in the range of 0.1 to 100 rad/s were measured at temperatures of 150° C., 170° C. and 190° C. A shift factor on the horizontal shift at a reference temperature of 150° C. was determined, and the activation energy of flow Ea was calculated by the Arrhenius equation.

《Melt Strength (MS)》

Melt strengths (MS) of an ethylene polymer and a propylene polymer resin composition were determined as follows.

An ethylene polymer used for testing was prepared by the same procedure as above-mentioned for the measurement of MFR wherein heat stabilizers were previously added and kneaded together.

Using a capillary viscometer having a barrel diameter of 9.55 mm "Capilograph™" available from Toyo Seiki Seisakusho K.K., the measurement was carried out at a die length of 8 mm, a die diameter of 2.095 mm, and an entrance angle of 90°. The melt strength ($MS_{160}$) was measured as a force (mN) required for taking off the molten polymer at a temperature of 160° C., a piston downstroke rate of 10 mm/min. and a draw ratio of 47. In the case when the maximum draw ratio was smaller than 47, a force (mN) required for taking off the molten polymer at the maximum draw ratio at which the taken molten polymer could be taken off without break, was measured as melt strength ($MS_{160}$).

The melt strength ($MS_{190}$) was measured by the same procedures as mentioned above except that the measurement temperature was changed to 190° C.

《Expansion Ratio》

A test specimen of a foamed article was made by extrusion-foaming a propylene polymer resin composition, and cutting the extrusion-foamed product into a cylindrical specimen having a diameter of 5 cm and a length of 10 cm. Weight (W2) (g) of the foamed specimen was measured and an apparent density thereof was calculated according to the following equation.

Apparent density(g/$cm^3$)=$W2/(2.5 \times 2.5 \times \pi \times 10)$

The expansion ratio was calculated according to the following equation.

Expansion ratio(times)=1/(apparent density)

《Appearance of Foamed Article and Configuration of Foam》

An extrusion-foamed article made from a propylene polymer resin composition was evaluated for its appearance and configuration of foam. The evaluation of configuration of foam was conducted by observing bubbles in a cross-section of the extrusion-foamed article by a microscope. The evaluation results were expressed by the following two ratings.

○: Foamed article generally has a smooth surface and is a closed-cell foam.

x: Foamed article generally has an uneven and rough surface and is an open-cell foam.

《Ratio of Closed-Cell》

The ratio [S:(%)] of closed-cell in a foamed specimen made from a propylene polymer resin composition was determined as follows.

True volume Vx (L) (i.e., the sum of a volume of bubbles in a closed-cell foam and a volume of a resin portion) was measured according to the procedure C described in ASTM D2856-70 using a Beckman 930 air comparison pycnometer available from Toshiba Beckman Co., Ltd. The ratio [5: (%)] of closed-cell in the foamed specimen was calculated according to the following equation.

$$S(\%)=(Va-Vx)\times 100/(Va-W/\rho)$$

wherein:

Va: apparent volume (L) calculated from the outer dimension of the foam specimen W: weight (g) of the foam specimen ρ: density (g/L) of the polymer resin constituting the foam specimen The measurement of the density (ρ) (g/L) of the polymer resin constituting the foam specimen, and the weight (g) of the foam specimen was conducted on a specimen which was prepared by defoaming the foam specimen by heat-pressing and then cooling the defoamed specimen.

《Tear Strength of Foam-Shaped Article》

A specimen of an extrusion-foamed article made from a propylene polymer resin composition was manually torn. The tear strength was evaluated by the degree of tearability and expressed by the following three ratings.

○: Not easily torn.

x: Easily torn.

Δ: Medial between "○: not easily torn" and "x: easily torn".

Production Example 1

[Preparation of Clay Mineral Treated with Organic Compound (Modified Clay Mineral)]

To 3 L (liters) of water, 3 L of ethanol and 100 mL (milliliter) of aqueous 37% concentrated hydrochloric acid were added, and then, 585 g (1.1 mol) of N-methyldioleylamine was added to the thus-mixed liquid. The mixed liquid was heated to 60° C. to give a solution of N-methyldioleylamine hydrochloride. To this solution, 1 kg of hectorite was added. The obtained slurry was stirred at 60° C. for 3 hours, and a supernatant was removed from the slurry. Then the slurry was washed with 50 L of water at 60° C., and then, dried at 60° C. and a pressure of $10^{-3}$ torr for 24 hours. The dried product was pulverized by a jet mill to give modified hectorite having an average particle diameter of 10.5 μm.

[Preparation of Catalyst for Production of Ethylene Polymer Resin]

500 g of the above-mentioned modified hectorite was suspended in 1.7 L of hexane, and then, a mixed liquid composed of 6.97 g (20.0 mmol) of dimethylsilanediyl-bis(cyclopentadienyl)zirconium dichloride and 2.8 L (2 mol) of a hexane solution of triisobutylaluminum (0.714 M) was added to the modified hectorite suspension. Then, 1.16 g (1.74 mmol [which amount corresponds to 8 mol % to the dimethylsilanediyl-bis(cyclopentadienyl)zirconium dichloride] of diphenylmethylene(1-cyclopentadienyl)(2,7-di-tert-butyl-1-9-fluorenyl)zirconium dichloride was added, and the resultant slurry was stirred at room temperature for 6 hours. The slurry was left to stand and a supernatant was removed therefrom. Finally a hexane solution of triisobutylaluminum (0.15 M) was added to the slurry to give 100 g/L of a catalyst slurry.

[Production of Ethylene Polymer Resin]

An autoclave (polymerization vessel) having an inner volume of 540 L was charged with 300 L of hexane and 1.0 L of 1-butene, and the content in the autoclave was heated to 85° C. Then 60 mL of the above-mentioned catalyst, described in [Preparation of Catalyst for Production of Ethylene Polymer Resin], was added into the autoclave. Ethylene/hydrogen mixed gas (containing 800 ppm of hydrogen) was introduced into the autoclave until the partial pressure reached 0.9 MPa to initiate the polymerization. During the polymerization, ethylene/hydrogen mixed gas (containing 800 ppm of hydrogen) was continuously introduced so that the partial pressure was maintained at 0.9 MPa. The polymerization temperature was maintained at 85° C. When 90 minutes elapsed from the commencement of polymerization, the inner pressure of the autoclave was released, and the content was filtered and dried to give 30 kg of a polyethylene powder. The polyethylene powder was melt-kneaded by using a single-screw extruder with a 50 mm diameter, maintained at 200° C. The thus-obtained extrudate was pelletized to give a polyethylene pellet.

The obtained polyethylene pellet had a density (d) of 950 kg/m$^3$, and a MFR of 4.0 g/10 min. Other characteristics of the polyethylene pellet are shown in Table 1.

Example 1

[Production of Propylene Polymer Resin Composition]

The above-mentioned polyethylene pellet was pellet-blended with commercially available polypropylene pellet (trade name "FX4E" available from Japan Polypropylene Corporation; MFR: 5 g/10 min., density: 900 kg/m$^3$) at a mixing ratio of 30:70 by weight. The mixed resin was melt-kneaded by a single-screw extruder with a 50 mm diameter available from Placo Co., Ltd. to give a propylene polymer resin composition. The barrel temperature was C1: 180° C., C2: 200° C., and C3: 220° C., and the die head temperature was 220° C.

[Production of Extrusion Foamed Article from Propylene Polymer Resin Composition]

100 Parts by weight of the above-mentioned propylene polymer resin composition was melt-blended with 0.7 part by weight of talc having an average particle diameter of 8 μm as a foam-nucleating agent. The blended resin composition was subjected to extrusion foaming using an extruder. That is, the resin composition was fed at a feed rate of 10 kg/hour to a single screw extruder (available from Kyoushin Kikai K. K.) with a screw diameter (D) 50 mm and L/D of 36 and having a barrel with an intake for a volatile liquid incorporation at a midway thereof. The resin composition was melt-kneaded while butane (volatile liquid) was pressed into the extruder at a rate of 700 g/hour through the intake of the barrel to be dispersed in the molten resin composition. The butane-incorporated molten resin composition was extruded through a die into a round rod-shaped extrudate. The die had an orifice with a 13 mm diameter for a round rod extrusion, and was maintained at a temperature of 160° C. which was the lowest temperature for giving a foam shaped article having an even and flat surface. The round rod-shaped extrudate was taken off at a rate of 5.0 m/min. while air was blown against the extrudate, to obtain an extrusion foamed article.

Closed-cell ratio, expansion ratio, configuration of foam, and tear strength of the extrusion foamed article were evaluated. The evaluation results of the extrusion foamed article, and the properties of the propylene polymer resin composition are shown in Table 1.

Example 2

A propylene polymer resin composition was subjected to extrusion foaming by the same procedures as described in Example 1 except that the ratio of polyethylene pellet/polypropylene pellet was changed to 20:80 by weight, and the foam characteristics of the obtained extrusion foamed article were evaluated. The evaluation results are shown in Table 1.

Example 3

A propylene polymer resin composition was subjected to extrusion foaming by the same procedures as described in Example 1 except that the polyethylene pellet was produced by the method mentioned in Production Example 2, below, and further that the ratio of polyethylene pellet/polypropylene pellet was changed to 10:90 by weight. The foam characteristics of the obtained extrusion foamed article were evaluated. The evaluation results are shown in Table 1.

Production Example 2

[Preparation of Modified Clay Mineral]

To 3 L (liters) of water, 3 L of ethanol and 100 mL (milliliter) of aqueous 37% concentrated hydrochloric acid were added, and then, 585 g (1.1 mol) of N-methyldioleylamine was added to the thus-mixed liquid. The mixed liquid was heated to 60° C. to give a solution of N-methyldioleylamine hydrochloride. To this solution, 1 kg of hectorite was added. The obtained slurry was stirred at 60° C. for 3 hours, and a supernatant was removed from the slurry. Then the slurry was washed with 50 L of water at 60° C., and then, dried at 60° C. and a pressure of $10^{-3}$ torr for 24 hours. The dried product was pulverized by a jet mill to give modified hectorite having an average particle diameter of 10.5 µm.

[Preparation of Catalyst for Production of Ethylene Polymer Resin]

500 g of the above-mentioned modified hectorite was suspended in 1.7 L of hexane, and then, a mixed liquid composed of 6.97 g (20.0 mmol) of dimethylsilanediyl-bis(cyclopentadienyl)zirconium dichloride and 2.8 L (2 mol) of a hexane solution of triisobutylaluminum (0.714 M) was added to the modified hectorite suspension. Then, 1.16 g (1.74 mmol [which amount corresponds to 8 mol % to the dimethylsilanediyl-bis(cyclopentadienyl)zirconium chloride] of diphenylmethylene(1-cyclopentadienyl)(2,7-di-tert-butyl-9-fluorenyl)zirconium dichloride was added, and the resultant slurry was stirred at room temperature for 6 hours. The slurry was left to stand and a supernatant was removed therefrom. Finally a hexane solution of triisobutylaluminum (0.15 M) was added to the slurry to give 100 g/L of a catalyst slurry.

[Production of Ethylene Polymer Resin]

An autoclave (polymerization vessel) having an inner volume of 540 L was charged with 300 L of hexane and 1.0 L of 1-butene, and the content in the autoclave was heated to 85° C. Then 60 mL of the above-mentioned catalyst, described in [Preparation of Catalyst for Production of Ethylene Polymer Resin], was added into the autoclave. Ethylene/hydrogen mixed gas (containing 500 ppm of hydrogen) was introduced into the autoclave until the partial pressure reached 0.9 MPa to initiate the polymerization. During the polymerization, ethylene/hydrogen mixed gas (containing 500 ppm of hydrogen) was continuously introduced so that the partial pressure was maintained at 0.9 MPa. The polymerization temperature was maintained at 85° C. When 90 minutes elapsed from the commencement of polymerization, the inner pressure of the autoclave was released, and the content was filtered and dried to give 30 kg of a polyethylene powder. The polyethylene powder was melt-kneaded by using a single-screw extruder with a 50 mm diameter, maintained at 200° C. The thus-obtained extrudate was pelletized to give a polyethylene pellet.

The obtained polyethylene pellet had a density (d) of 950 kg/m$^3$, and a MFR of 2.0 g/10 min. Other characteristics of the polyethylene pellet are shown in Table 1.

Comparative Example 1

A propylene polymer resin composition was subjected to extrusion foaming by the same procedures as described in Example 1 except that commercially available low-density polyethylene (LDPE) prepared by high-pressure polymerization process (trade name "Petrocene 203" available from Tosoh Corporation, MFR: 8 g/10 min., density: 919 kg/m$^3$) was used instead of the polyethylene produced in Production Example 1, and further that the ratio of polyethylene pellet/polypropylene pellet was changed to 10:90 by weight. The foam characteristics of the obtained extrusion foamed article were evaluated. The evaluation results are shown in Table 1.

Comparative Example 2

A propylene polymer resin composition was subjected to extrusion foaming by the same procedures as described in Example 1 except that commercially available straight-chain low-density polyethylene prepared using a metallocene catalyst (trade name "Umerit 4540F" available from Ube Industries Ltd., MFR: 3.9 g/10 min., density: 944 kg/m$^3$) was used instead of the polyethylene produced in Production Example 1, and further that the ratio of polyethylene pellet/polypropylene pellet was changed to 10:90 by weight. The foam characteristics of the obtained extrusion foamed article were evaluated. The evaluation results are shown in Table 1.

Comparative Example 3

A propylene polymer resin composition was subjected to extrusion foaming by the same procedures as described in Example 1 except that the ratio of polyethylene pellet/polypropylene pellet was changed to 0.1:99.9 by weight, and the foam characteristics of the obtained extrusion foamed article were evaluated. The evaluation results are shown in Table 1.

Comparative Example 4

A propylene polymer resin composition was subjected to extrusion foaming by the same procedures as described in Example 1 except that the ratio of polyethylene pellet/polypropylene pellet was changed to 52:48 by weight, and the foam characteristics of the obtained extrusion foamed article were evaluated. The evaluation results are shown in Table 1.

TABLE 1

| | Example | | | Comparative example | | | |
|---|---|---|---|---|---|---|---|
| | 1 | 2 | 3 | 1 | 2 | 3 | 4 |
| Ethylene polymer | | | | | | | |
| Kind | Production example | | | Petrocen 203 | Umerit 4540 | Production example | |
| | 1 | 1 | 2 | | | 1 | 1 |
| Density (kg/m$^3$) | 950 | 950 | 950 | 919 | 944 | 950 | 950 |
| MFR (g/10 min.) | 4 | 4 | 2 | 8 | 3.9 | 4 | 4 |
| Frequency of terminal vinyl (/1000C) | 0.03 | 0.03 | 0.03 | 0 | 0.5 | 0.03 | 0.03 |
| Mw/Mn | 6.7 | 6.7 | 7.3 | 8.6 | 3.1 | 6.7 | 6.7 |
| MS$_{160}$ (mN) | 120 | 120 | 150 | 50 | 12 | 120 | 120 |
| MS$_{190}$ (mN) | 95 | 95 | 120 | 25 | 10 | 95 | 95 |
| Ea (kJ/mol) | 32.5 | 32.5 | 31.8 | 53 | 25 | 32.5 | 32.5 |
| Propylene polymer resin composition | | | | | | | |
| Content of ethylene polymer*1 (wt %) | 30 | 20 | 10 | 10 | 10 | 0.1 | 52 |
| MS$_{190}$ (mN) | 110 | 105 | 40 | 16 | <10 | <10 | 105 |
| MFR (g/10 min.) | 5.6 | 4.9 | 40 | 45 | 42 | 49 | 30 |
| Foam characteristics | | | | | | | |
| Closed-cell ratio (%) | 60 | 70 | 70 | 20 | 0 | 5 | 80 |
| Expansion ratio (times) | 33 | 30 | 29 | 15 | 10 | 11 | 33 |
| Configuration of foam | ○ | ○ | ○ | x | x | x | ○ |
| Tear strength | ○ | ○ | ○ | ○ | ○ | ○ | Δ |

*1[ethylene polymer weight/(ethylene polymer weight + propylene polymer weight)] × 100 (%)

INDUSTRIAL APPLICABILITY

The propylene polymer resin composition of the present invention, which has incorporated therein a specific ethylene polymer resin, has high melt strength and exhibits enhanced flowability and processability. Even when the ethylene polymer resin is incorporated in the propylene polymer resin composition in a small amount, the melt strength of the propylene polymer resin can be greatly enhanced. Thus, the extrusion foaming property and processability of a propylene polymer resin can be improved while the beneficial properties of the propylene polymer resin are substantially kept.

Utilizing the above-mentioned characteristics, the propylene polymer resin composition of the present invention is suitable for foaming, blow molding, hollow processing and extrusion processing, and especially suitable for extrusion foaming.

The invention claimed is:

1. A propylene polymer resin composition, comprising:
   50% to 99% by weight of a propylene polymer resin; and
   1% to 50% by weight of an ethylene polymer resin,
   wherein the ethylene polymer resin has:
   (A) a density (d), as measured by a density gradient tube method according to JIS K6760, in the range of 940 kg/m$^3$ to 960 kg/m$^3$;
   (B) a melt flow rate (MFR), as measured at 190° C. under a load of 2.16 kg, in the range of 1 g/10 min. to 10 g/10 min.;
   (C) a frequency of terminal vinyl of not more than 0.2 per 1,000 carbon atoms;
   (D) a melt strength (MS$_{160}$), as measured at 160° C., of at least 100 mN; and
   (E) an activation energy of flow (Ea) of not larger than 35 kJ/mol,
   and wherein the propylene polymer resin composition satisfies a relationship between a melt strength (MS$_{190}$) and a melt flow rate (MFR), expressed by formula (7):

$$MS_{190} > 40 - 20 \times \log(MFR) \quad (7),$$

wherein
   MS$_{190}$ is a melt strength (mN) as measured at 190° C., and
   MFR is a melt flow rate (g/10 min.) as measured at 190° C. under a load of 2.16 kg.

2. The composition of claim 1, wherein the ethylene polymer resin further has:
   (F) a ratio (Mw/Mn) of weight average molecular weight (Mw) to number average molecular weight (Mn) in a range of 5 to 10.

3. The composition of claim 1, wherein the ethylene polymer resin further has:
   (G) a relationship between melt strength (MS$_{160}$) and melt flow rate (MFR), satisfying formula (1)

$$MS_{160} > 90 - 130 \times \log(MFR) \quad (1)$$

wherein
   MS$_{160}$ is a melt strength (mN) as measured at 160° C., and
   MFR is a melt flow rate (g/10 min.) as measured at 190° C. under a load of 2.16 kg.

4. The composition of claim 1, wherein the ethylene polymer resin further has:
   (H) a relationship between a melt strength (MS$_{160}$) and a melt strength (MS$_{190}$), satisfying formula (3)

$$MS_{160}/MS_{190} < 1.8 \quad (3),$$

wherein
   MS$_{160}$ is a melt strength (mN) as measured at 160° C., and
   MS$_{190}$ is a melt strength (mN) as measured at 190° C.

5. The composition of claim 1, wherein the ethylene polymer resin further has:
   (I) a relationship between an activation energy of flow (Ea) and a density (d), satisfying formula (5)

$$125 - 0.105d < Ea < 88 - 0.0550d \quad (5),$$

wherein
   Ea is an activation energy of flow (kJ/mol), and
   d is a density (kg/m$^3$) as measured by a density gradient tube method according to JIS K6760.

6. The composition of claim 2, wherein the ethylene polymer resin further has:

(G) a relationship between melt strength ($MS_{160}$) and melt flow rate (MFR), satisfying formula (1)

$$MS_{160} > 90 - 130 \times \log(MFR) \qquad (1),$$

wherein
$MS_{160}$ is a melt strength (mN) as measured at 160° C., and
MFR is a melt flow rate (g/10 min.) as measured at 190° C. under a load of 2.16 kg.

7. The composition of claim 2, wherein the ethylene polymer resin further has:
(H) a relationship between a melt strength ($MS_{160}$) and a melt strength ($MS_{190}$), satisfying formula (3)

$$MS_{160}/MS_{190} < 1.8 \qquad (3),$$

wherein
$MS_{160}$ is a melt strength (mN) as measured at 160° C., and
$MS_{190}$ is a melt strength (mN) as measured at 190° C.

8. The composition of claim 3, wherein the ethylene polymer resin further has:
(H) a relationship between a melt strength ($MS_{160}$) and a melt strength ($MS_{190}$), satisfying formula (3)

$$MS_{160}/MS_{190} < 1.8 \qquad (3),$$

wherein
$MS_{160}$ is a melt strength (mN) as measured at 160° C., and
$MS_{190}$ is a melt strength (mN) as measured at 190° C.

9. The composition of claim 2, wherein the ethylene polymer resin further has:
(I) a relationship between an activation energy of flow (Ea) and a density (d), satisfying formula (5)

$$125 - 0.105d < Ea < 88 - 0.0550d \qquad (5),$$

wherein
Ea is an activation energy of flow (kJ/mol), and
d is a density (kg/m³) as measured by a density gradient tube method according to JIS K6760.

10. The composition of claim 3, wherein the ethylene polymer resin further has:
(I) a relationship between an activation energy of flow (Ea) and a density (d), satisfying formula (5)

$$125 - 0.105d < Ea < 88 - 0.0550d \qquad (5),$$

wherein
Ea is an activation energy of flow (kJ/mol), and
d is a density (kg/m³) as measured by a density gradient tube method according to JIS K6760.

11. The composition of claim 4, wherein the ethylene polymer resin further has:
(I) a relationship between an activation energy of flow (Ea) and a density (d), satisfying formula (5)

$$125 - 0.105d < Ea < 88 - 0.0550d \qquad (5),$$

wherein
Ea is an activation energy of flow (kJ/mol), and
d is a density (kg/m³) as measured by a density gradient tube method according to JIS K6760.

12. The composition of claim 6, wherein the ethylene polymer resin further has:
(H) a relationship between a melt strength ($MS_{160}$) and a melt strength ($MS_{190}$), satisfying formula (3)

$$MS_{160}/MS_{190} < 1.8 \qquad (3),$$

wherein
$MS_{160}$ is a melt strength (mN) as measured at 160° C., and
$MS_{190}$ is a melt strength (mN) as measured at 190° C.

13. An article, made by a process comprising foaming, blow molding, or extrusion foaming a propylene polymer resin composition, said propylene polymer resin composition comprising:
50% to 99% by weight of a propylene polymer resin; and
1% to 50% by weight of an ethylene polymer resin,
wherein the ethylene polymer resin has:
(A) a density (d), as measured by a density gradient tube method according to JIS K6760, in the range of 940 kg/m³ to 960 kg/m³;
(B) a melt flow rate (MFR), as measured at 190° C. under a load of 2.16 kg, in the range of 1 g/10 min. to 10 g/10 min.;
(C) a frequency of terminal vinyl of not more than 0.2 per 1,000 carbon atoms;
(D) a melt strength ($MS_{160}$), as measured at 160° C., of at least 100 mN; and
(E) an activation energy of flow (Ea) of not larger than 35 kJ/mol,
and wherein the propylene polymer resin composition satisfies a relationship between a melt strength ($MS_{190}$) and a melt flow rate (MFR), expressed by formula (7):

$$MS_{190} > 40 - 20 \times \log(MFR) \qquad (7),$$

wherein
$MS_{190}$ is a melt strength (mN) as measured at 190° C., and
MFR is a melt flow rate (g/10 min.) as measured at 190° C. under a load of 2.16 kg.

14. The article of claim 13, wherein said article is a foam shaped article made by a process comprising foaming said propylene polymer resin composition.

15. The article of claim 13, wherein said article is a blow molded article made by a process comprising blow molding said propylene polymer resin composition.

16. The article of claim 13, wherein said article is an extrusion foamed article made by a process comprising extrusion foaming said propylene polymer resin, said propylene polymer resin further having a melt flow rate (MFR) as measured at 230° C. of smaller than 10 g/10 min. and a melt strength ($MS_{190}$) as measured at 190° C. of at least 10 mN.

* * * * *